US012771163B2

(12) United States Patent
Suzuki

(10) Patent No.: US 12,771,163 B2
(45) Date of Patent: Oct. 20, 2026

(54) INFORMATION PROCESSING APPARATUS AND CONTROL METHOD

(71) Applicant: CANON KABUSHIKI KAISHA, Tokyo (JP)

(72) Inventor: Masaki Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/942,053

(22) Filed: Nov. 8, 2024

(65) Prior Publication Data

US 2025/0158447 A1 May 15, 2025

(30) Foreign Application Priority Data

Nov. 14, 2023 (JP) ................................ 2023-193845

(51) Int. Cl.
*H02J 9/06* (2006.01)

(52) U.S. Cl.
CPC .................................... *H02J 9/06* (2013.01)

(58) Field of Classification Search
CPC ............ H02J 9/06; G06F 1/263; G06F 1/305
See application file for complete search history.

(56) References Cited

U.S. PATENT DOCUMENTS

2015/0380968 A1* 12/2015 Lee ........................ H02J 7/865 713/300
2019/0204895 A1* 7/2019 Kitanosako ............ G06F 1/266
2020/0241618 A1 7/2020 Ohtake
2021/0132673 A1* 5/2021 Hayashi .............. H02H 3/0935
2021/0305828 A1* 9/2021 Shih ....................... G06F 1/263

FOREIGN PATENT DOCUMENTS

JP 2021154699 A 10/2021

* cited by examiner

*Primary Examiner* — Rexford N Barnie
*Assistant Examiner* — Joseph N Inge
(74) *Attorney, Agent, or Firm* — Canon.U.S.A., .Inc. IP Division

(57) ABSTRACT

A processing apparatus includes a battery, a receiving unit configured to receive power from a power supply apparatus connected to the processing apparatus, a processing unit configured to execute predetermined processing by the power of the power supply apparatus or the power of the battery, and a control unit configured to switch the power to be supplied to the processing unit to the power supplied from the power supply apparatus or the power of the battery. When power supply of the power supply apparatus is resumed within a predetermined time from stop of the power supply of the power supply apparatus, the processing apparatus switches the power to be supplied to the processing unit to the power of the battery.

19 Claims, 8 Drawing Sheets

INFORMATION PROCESSING APPARATUS AND CONTROL METHOD

BACKGROUND

Technical Field

The aspect of the embodiments relates to a control technique of an information processing apparatus that is operated by power supplied from a power supply device.

Description of the Related Art

The Universal Serial Bus (USB) Power Delivery (PD) standard is a standard for connecting a power supply device and a power receiving device by a connector and a cable of the USB Type-C standard and enable power supply. In the USB PD standard, the power supply device (Source) and the power receiving device (Sink) perform communication (negotiation) to decide available for power supply or receivable power based on a power rule formed by a combination of a voltage value and a current value.

Some power supply devices complying with the USB PD standard include a plurality of connectors to which a plurality of power receiving devices can be connected. Such a power supply device including a plurality of connectors can perform negotiation with a plurality of power receiving devices connected via general-purpose interface cables and supply optimum power to the power receiving devices.

The negotiation is executed every time a power receiving device is connected to the power supply device. For this reason, in a case where a power receiving device different from an already connected power receiving device is connected to the power supply device, negotiation is executed. During the negotiation, power supply from the power supply device is interrupted. Hence, power supply to the already connected power receiving device is interrupted, and resumed after the negotiation.

For this reason, in a case where another power receiving device is connected halfway through predetermined processing (for example, printing) performed by the power receiving device already connected to the power supply device, power supply is instantaneously interrupted, and an excellent processing result may not be obtained. As an example of an event during printing, power supply to a paper conveyance motor is instantaneously interrupted, the paper conveyance speed thus varies, streak-shaped lines are formed on a printed product, and consequently, paper and ink are wasted to redo printing. Also, when the user of the power receiving device is not notified of the power supply interruption caused by negotiation, it is difficult for the user to recognize the instantaneous power supply interruption. For this reason, a similar event may repetitively occur, and a large quantity of paper and ink may be wasted.

SUMMARY

The aspect of the embodiments provides a processing apparatus comprising: a battery; a receiving unit configured to receive power from a power supply apparatus connected to the processing apparatus; a processing unit configured to execute predetermined processing by the power of the power supply apparatus or the power of the battery; and a control unit configured to switch the power to be supplied to the processing unit to the power supplied from the power supply apparatus or the power of the battery, wherein when power supply of the power supply apparatus is resumed within a predetermined time from stop of the power supply of the power supply apparatus, the control unit switches the power to be supplied to the processing unit to the power of the battery.

The aspect of the embodiments provides a method of a processing apparatus, wherein the processing apparatus includes a battery; a receiving unit configured to receive power from a power supply apparatus connected to the processing apparatus; and a processing unit configured to execute predetermined processing by the power of the power supply apparatus or the power of the battery, the control method comprising: switching the power to be supplied to the processing unit to the power supplied from the power supply apparatus or the power of the battery, and in the switching, when power supply of the power supply apparatus is resumed within a predetermined time from stop of the power supply of the power supply apparatus, the power to be supplied to the processing unit is switched to the power of the battery.

Further features of the disclosure will become apparent from the following description of exemplary embodiments (with reference to the attached drawings).

DESCRIPTION OF THE EMBODIMENTS

Figure 1:
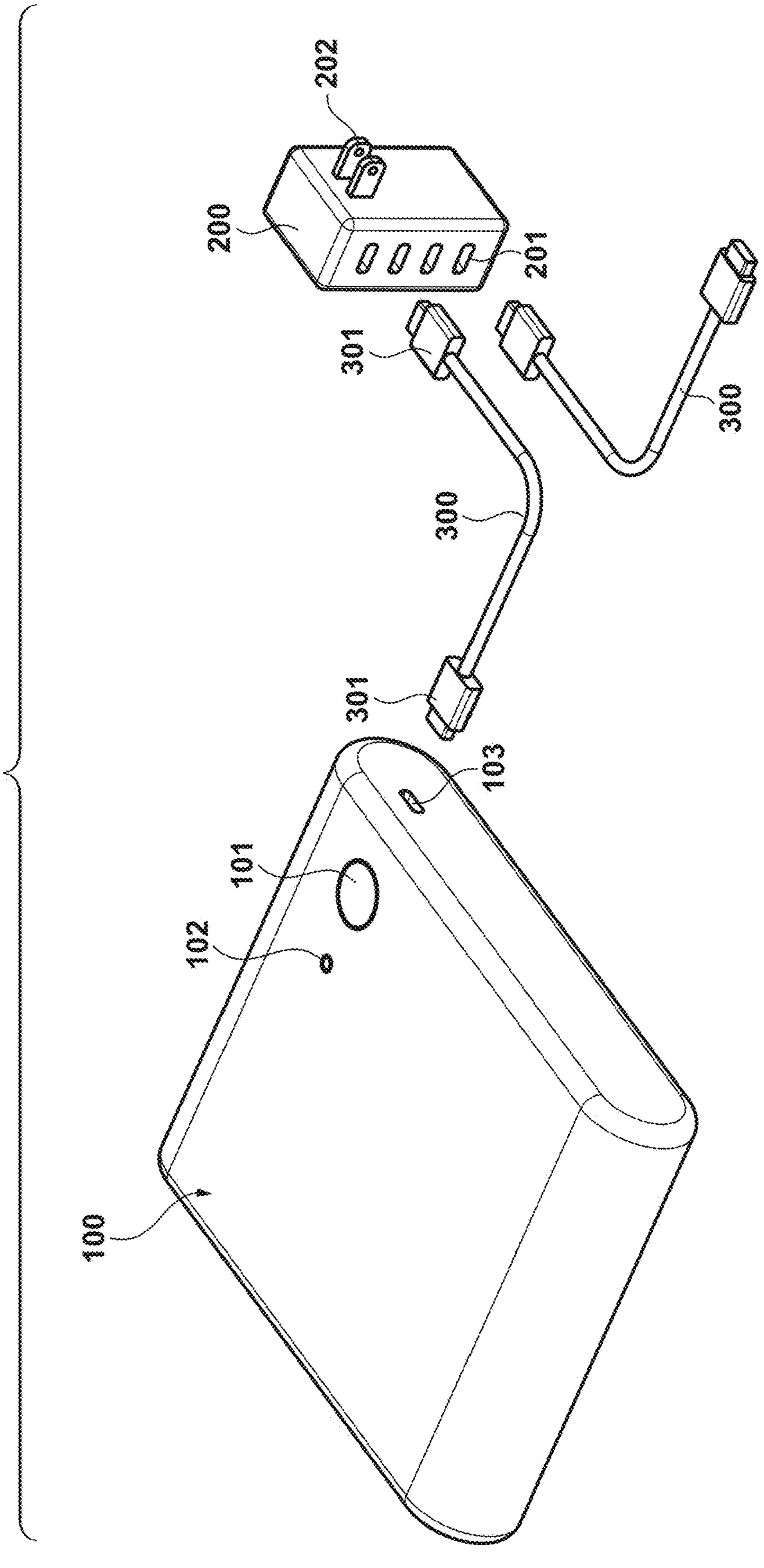
FIG. 1 is a perspective view exemplarily showing a system including a power receiving device and a power supply device according to a present embodiment.

Hereinafter, embodiments will be described in detail with reference to the attached drawings. Note, the following embodiments are not intended to limit the scope of the disclosure. Multiple features are described in the embodiments, but limitation is not made to the disclosure that requires all such features, and multiple such features may be combined as appropriate. Furthermore, in the attached drawings, the same reference numerals are given to the same or similar configurations, and redundant description thereof is omitted.

First Embodiment

The first embodiment will now be described with reference to FIGS. 1 to 3.

In the present embodiment, an example of a system in which a power receiving device is an information processing apparatus such as a printing apparatus, a power supply device is a power supply apparatus such as a charger, and a plurality of power receiving devices can be connected to the power supply device will be described.

FIG. 1 is a perspective view exemplarily showing a system including a power receiving device and a power supply device according to the present embodiment.

In FIG. 1, a printing apparatus 100 that is a power receiving device and a power supply apparatus 200 that is a power supply device are connected by a general-purpose interface cable 300 such that these can perform communication and power transmission/reception. The printing apparatus 100 is, for example, a compact and lightweight portable printer or mobile printer suitable for portable use. The power supply apparatus 200 is, for example, a general-purpose charger that uses an AC commercial power supply, a mobile battery, or a cigarette lighter socket as a power supply. The general-purpose interface cable (to be referred to as the connection cable hereinafter) 300 is, for example, a USB Type-C cable. The printing apparatus 100 and the power supply apparatus 200 can electrically be connected by the connection cable 300 complying with the USB Type-C standard and including connectors complying with the USB Type-C standard.

In the present embodiment, the printing apparatus 100 and the power supply apparatus 200 operate as a power receiving device (Sink) and a power supply device (Source) adapted to the Universal Serial Bus (USB) Power Delivery (PD) standard. The power receiving device (Sink) and the power supply device (Source) perform negotiation to decide power to be supplied according to a combination of a voltage value (for example, 5 V, 9 V, 15 V, or 20 V) and a current value (for example, 3 A or 5 A) decided in advance based on a power rule. The power supply apparatus 200 can supply power of 100 W at maximum based on the USB PD standard.

The printing apparatus 100 includes an operation unit 101 and an display unit 102. The operation unit 101 and the display unit 102 are provided on the upper surface portion of the printing apparatus 100. In the present embodiment, the operation unit 101 is a power button, and a user can power on the printing apparatus 100 by operating the power button. The display unit 102 includes a light source such as an LED capable of blinking or lighting. The display unit 102 lights when the printing apparatus 100 is powered on, and blinks in accordance with the operation state of the printing apparatus 100.

Also, the printing apparatus 100 includes a connector 103. The connector 103 is provided on a side surface portion of the printing apparatus 100. The connector 103 is, for example, a receptacle connector complying with the USB Type-C standard, and can electrically be connected to the power supply apparatus 200 via the connection cable 300.

The power supply apparatus 200 includes a connector 201 and a connection terminal 202. The connection terminal 202 is configured to be connectable to an AC commercial power supply. The connector 201 is a receptacle connector complying with the USB Type-C standard. The power supply apparatus 200 includes a plurality of (for example, four) connectors 201, can be simultaneously connected to a plurality of power receiving devices via the connection cables 300, and can perform communication and power transmission/reception with the connected power receiving devices.

The connection cable 300 includes connectors 301. The connectors 301 are provided on both end portions of the connection cable 300. The connector 301 is a plug connector complying with the USB Type-C standard.

Figure 2:
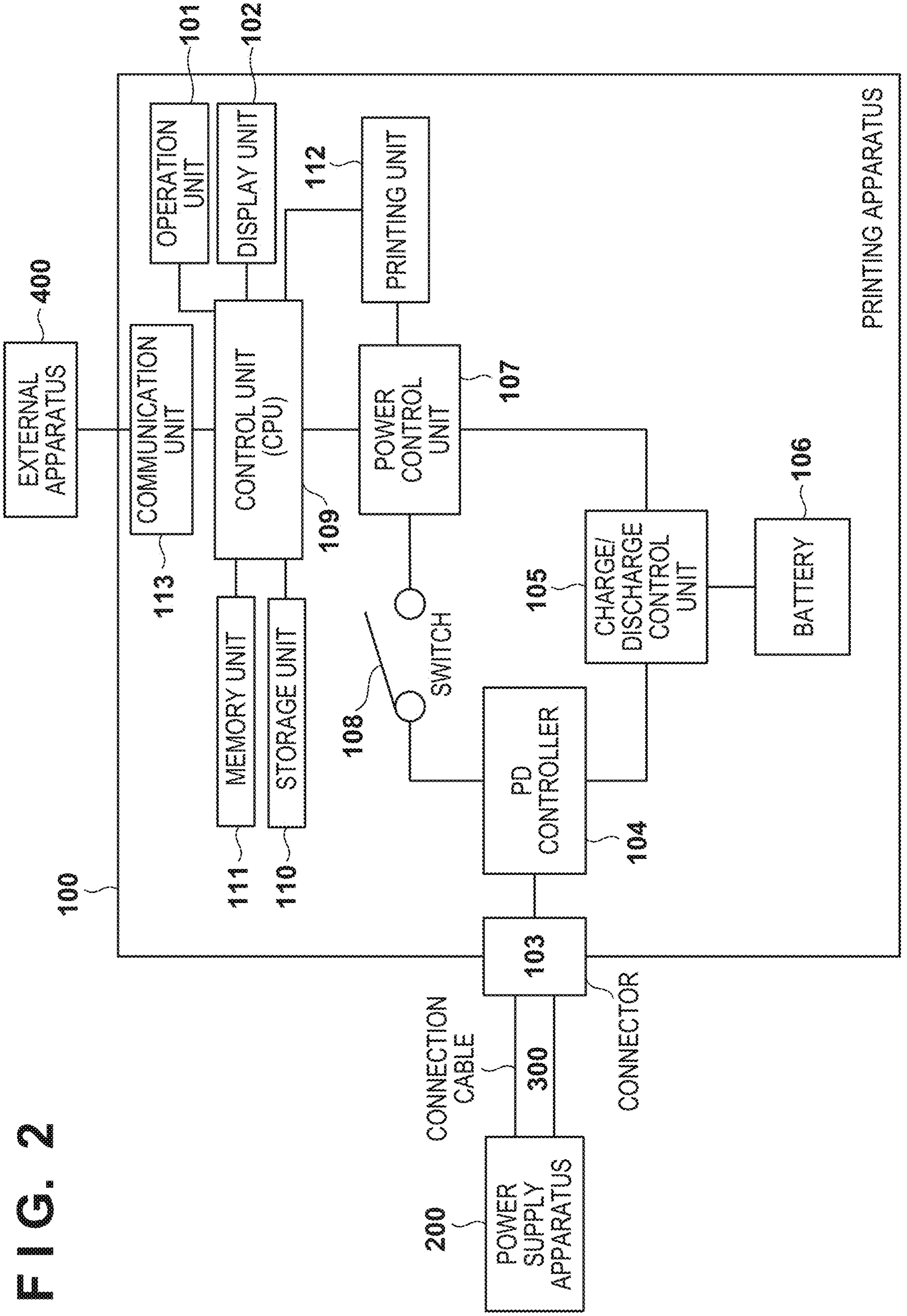
FIG. 2 is a block diagram exemplarily showing the configuration of the power receiving device included in the system according to the present embodiment.

FIG. 2 is a block diagram exemplarily showing the hardware configuration of the printing apparatus 100 according to the first embodiment.

The printing apparatus 100 includes a PD controller 104 complying with the USB PD standard. When the power supply apparatus 200 complying with the USB PD standard is connected to the connector 103 via the connection cable 300, the PD controller 104 executes negotiation and requests necessary power from the power supply apparatus 200. The power supply apparatus 200 supplies power requested by the printing apparatus 100 by the negotiation. The power supply apparatus 200 stops power supply during the negotiation with the printing apparatus 100, and starts power supply after completion of the negotiation. Time needed for the negotiation is about 10 to 500 msec. When the power supply apparatus 200 is connected to the printing apparatus 100, negotiation is instantaneously completed, and power supply is started. The PD controller 104 always monitors the power supplied from the power supply apparatus 200, and can detect that power supply from the power supply apparatus 200 is interrupted.

Under the control of the PD controller 104, a charge/discharge control unit 105 executes charge control for charging a battery 106 using power supplied from the power supply apparatus 200 and discharge control for supplying power of the battery 106 to a power control unit 107.

The battery 106 is a secondary battery detachably attached to the printing apparatus 100, and is, for example, a lithium-ion battery capable of supplying power for making the printing apparatus 100 operable. The battery 106 is built in the printing apparatus 100.

The power control unit 107 performs control of switching power to be supplied to a control unit 109 and a printing unit 112 to power supplied from the power supply apparatus 200 or power of the battery 106 in accordance with an ON state or an OFF state of a switch 108.

The power control unit 107 sets the switch 108 to the ON state or the OFF state based on information obtained from the power supply apparatus 200 by the PD controller 104. When the switch 108 in the ON state, the PD controller 104 outputs power supplied from the power supply apparatus 200 to the power control unit 107. When the switch 108 in the OFF state, the PD controller 104 outputs whole power supplied from the power supply apparatus 200 to the charge/discharge control unit 105 to charge the battery 106.

The control unit 109 includes a processor (CPU) that performs operation processing and control processing of the printing apparatus 100.

A storage unit 110 is a nonvolatile memory that stores constants for the operation of the control unit 109 and programs (firmware), and is, for example, an EEPROM or a flash memory. The programs according to the present embodiment are programs configured to execute flowcharts shown in FIGS. 3, 5, and 7 to be described later.

A memory unit 111 is a volatile memory in which constants and variables for the operation of the control unit 109 and programs read out from the storage unit 110 are loaded, and is, for example, a RAM. The control unit 109 loads a program stored in the storage unit 110 to the memory unit 111 and executes it, thereby controlling the components of the printing apparatus 100.

The printing unit 112 executes print processing of printing image data on paper. The printing unit 112 includes a printhead, a head driving circuit, a paper feed roller, a roller driving motor, a motor driving circuit, and the like. A communication unit 113 is an interface connectable to an external apparatus 400 by wireless communication or wired communication, and includes a communication circuit that transmits/receives data to/from the external apparatus 400. The external apparatus 400 is, for example, a communication device such as a smartphone held by the user or an information processing apparatus such as a tablet computer. The printing apparatus 100 receives image data and a print start command from the external apparatus 400 via the communication unit 113. Based on the print start command received from the external apparatus 400, the control unit 109 controls the printing unit 112 and executes print processing of printing image data on paper. Also, the printing apparatus 100 transmits state information such as an operation state of the printing apparatus 100 to the external apparatus 400 via the communication unit 113. The external apparatus 400 displays information based on the state information received from the printing apparatus 100, thereby notifying the user of that.

The power control unit 107 controls power to be supplied to the control unit 109 and the printing unit 112. When the switch 108 is in the ON state, the power control unit 107 directly supplies power supplied from the power supply apparatus 200 to the control unit 109 and the printing unit 112. Since the control unit 109 and the printing unit 112 can be operated by the power supplied from the power supply apparatus 200, power of the battery 106 is not consumed, and the remaining amount of the battery 106 does not decrease. On the other hand, when the switch 108 is set in the OFF state, the power control unit 107 supplies power of the battery 106 to the control unit 109 and the printing unit 112. Since the control unit 109 and the printing unit 112 can be operated by the power of only the battery 106, the remaining amount of the battery 106 decreases.

Power supply control of the printing apparatus 100 according to the first embodiment will be described next.

Figure 3:
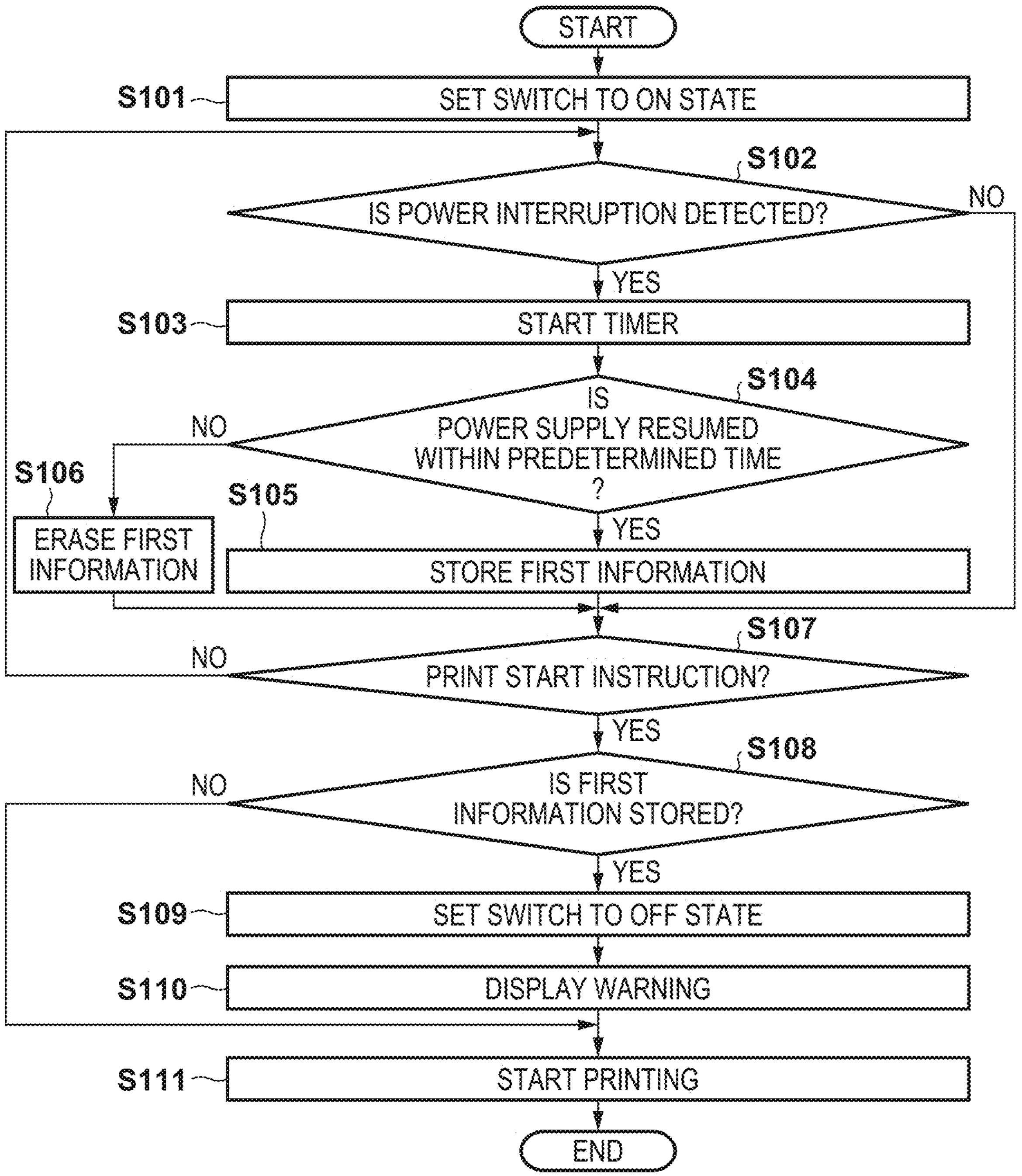
FIG. 3 is a flowchart exemplarily showing control processing according to the first embodiment.
Figure 4:
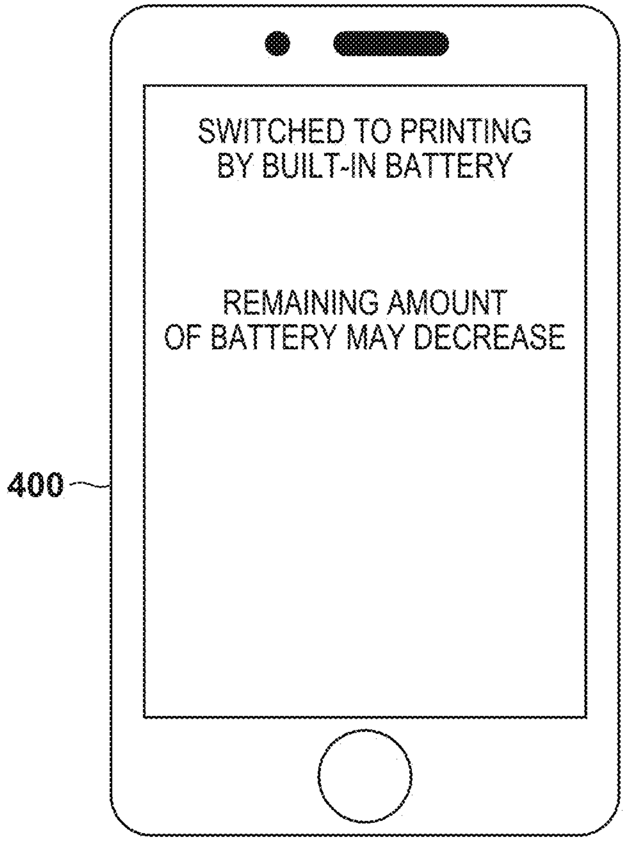
FIG. 4 is a view exemplarily showing a warning screen displayed on an external apparatus in the control processing according to the first embodiment.

FIG. 3 is a flowchart exemplarily showing power supply control of the printing apparatus 100 according to the first embodiment. FIG. 4 exemplarily shows a warning screen displayed on the external apparatus 400 in the power supply control of the printing apparatus 100 according to the first embodiment.

Note that the processing shown in FIG. 3 is implemented by the control unit 109 loading a program stored in the storage unit 110 into the memory unit 111 and executing it to control the components of the printing apparatus 100. Also, at the start point of the processing shown in FIG. 3, the printing apparatus 100 is powered on, the printing apparatus 100 and the power supply apparatus 200 connected by the connection cable 300 complete negotiation, and a state in which the power supply apparatus 200 can supply power to the printing apparatus 100 is obtained. This also applies to FIGS. 5 and 7 to be described later.

In step S101, the control unit 109 sets the switch 108 to the ON state by the PD controller 104. The power control unit 107 supplies power supplied from the power supply apparatus 200 to the control unit 109 and the printing unit 112.

In step S102, the control unit 109 determines whether the power supplied from the power supply apparatus 200 is cut off. Upon determining that the PD controller 104 detects interruption of power supply from the power supply apparatus 200, the control unit 109 advances the processing to step S103. Upon determining that interruption of power supply from the power supply apparatus 200 is not detected by the PD controller 104, and the power is continuously supplied from the power supply apparatus 200, the control unit 109 advances the processing to step S107.

In step S103, the control unit 109 starts counting time using a timer and measures an elapsed time from interruption of power supply from the power supply apparatus 200.

In step S104, the control unit 109 determines whether power supply from the power supply apparatus 200 is resumed within a predetermined time from the interruption of power supply from the power supply apparatus 200. When the PD controller 104 detects that power supply from the power supply apparatus 200 is resumed, the control unit 109 refers to the time measured by the timer started in step S103 and determines whether the time of the interruption of power supply from the power supply apparatus 200 is a predetermined time or less. Upon determining that the time of the interruption of power supply from the power supply apparatus 200 is the predetermined time or less, the control unit 109 advances the processing to step S105. Upon determining that the time of the interruption of power supply from the power supply apparatus 200 exceeds the predetermined time, the control unit 109 advances the processing to step S106.

In step S105, the control unit 109 stores, in the memory unit 111, first information indicating that power supply is instantaneously interrupted.

In step S106, the control unit 109 erases first information stored in the memory unit 111. Note that the predetermined time is set to about 1 sec, but the aspect of the embodiments is not limited to this, and the predetermined time may be set to another time.

In step S107, the control unit 109 determines whether the communication unit 113 receives a print instruction from the external apparatus 400. Upon determining that a print instruction is received from the external apparatus 400, the control unit 109 advances the processing to step S108. Upon determining that a print instruction is not received, the control unit 109 returns the processing to step S102.

In step S108, the control unit 109 determines whether the first information is stored in the memory unit 111. Upon determining that the first information is stored in the memory unit 111, the control unit 109 advances the processing to step S109. Upon determining that the first information is not stored in the memory unit 111, the control unit 109 advances the processing to step S111.

In step S109, the control unit 109 sets the switch 108 to the OFF state by the PD controller 104. The power control unit 107 switches the power to be supplied to the control unit 109 and the printing unit 112 from the power supplied from the power supply apparatus 200 to the power of the battery 106.

In step S110, the control unit 109 transmits the first information and a display instruction to the external apparatus 400. The external apparatus 400 displays the warning screen exemplarily shown in FIG. 4 based on the first information and the display instruction received from the printing apparatus 100. In the example shown in FIG. 4, the first information is information for notifying the user that switching from power supply from the power supply apparatus 200 to power supply from the battery 106 is performed, and there is a possibility that the remaining amount of the battery 106 will decrease.

In step S111, the control unit 109 starts print processing by the printing unit 112 based on image data and the print instruction received from the external apparatus 400, and ends the processing. Note that upon determining in step S108 that the first information is not stored in the memory unit 111, the control unit 109 starts print processing while keeping the switch 108 in the ON state.

In step S104, the predetermined time is about 1 sec. When instantaneous power supply interruption for 1 sec or less occurs, the first information is stored in the memory unit 111, and in step S108, the switch 108 is on/off-controlled based on the first information in the memory unit 111, and printing is started.

As an assumed factor of instantaneous power supply interruption, there is a case where after the power supply apparatus 200 and the printing apparatus 100 are connected, another power receiving device that is not the printing apparatus 100 is connected to the power supply apparatus 200, and negotiation is executed again. When the user connects or disconnects another power receiving device during print processing of the printing apparatus 100, the power supply apparatus 200 performs negotiation again with all power receiving devices including the connected printing apparatus 100. During the negotiation, the power supply apparatus 200 stops power supply and, therefore, power supply to the printing unit 112 is temporarily stopped when the switch 108 is in the ON state. For this reason, an event occurs that power supply to a paper conveyance motor is instantaneously interrupted, the paper conveyance speed thus varies, and streak-shaped lines are formed on a printed product, and consequently, paper and ink are wasted to redo printing.

In the present embodiment, when it is detected in step S103 that instantaneous power supply interruption has occurred, and the first information is stored in the memory unit 111 in step S108, it is estimated that there is high possibility that negotiation will be executed after the power supply apparatus 200 and the printing apparatus 100 are connected, and in step S109, the switch 108 is switched to the OFF state to perform switching from power supply from the power supply apparatus 200 to power supply from the battery 106. Since power to the printing unit 112 during print processing is supplied from the battery 106, even when instantaneous interruption occurs due to execution of negotiation between the printing apparatus 100 and the power supply apparatus 200 during print processing, an influence on the printed product can be reduced. Also, since the user is notified in step S110 that switching to power supply from the battery 106 is performed, the user can recognize that there is possibility that the remaining amount of the battery 106 will decrease due to print processing, but this is not a failure.

When the first information is not stored in the memory unit 111 in step S108, it is estimated that negotiation does not occur after the power supply apparatus 200 and the printing apparatus 100 are connected. In this case, since the possibility that the printing apparatus 100 and the power supply apparatus 200 will perform negotiation again during print processing is low, print processing is started while keeping the switch 108 in the ON state, and power supplied from the power supply apparatus 200 is directly supplied to the printing unit 112. Thus, the power of the battery 106 is not consumed, and the remaining amount of the battery 106 does not decrease.

In the present embodiment, a configuration in which power can directly be supplied from the power supply apparatus 200 to the power control unit 107 by providing the switch 108 between the PD controller 104 and the power control unit 107 has been exemplified, but the aspect of the embodiments is not limited to this. For example, without providing the switch 108, control may be done only by the charge/discharge control unit 105. The power supplied from the power supply apparatus 200 is wholly sent to the charge/discharge control unit 105 by the PD controller 104, and the charge/discharge control unit 105 does not supply the power to the battery 106 but supplies the whole power to the power control unit 107, thereby implementing the same control as in a case where the switch 108 is provided.

Second Embodiment

The second embodiment will be described next with reference to FIGS. 2, 5, and 6.

Figure 5:
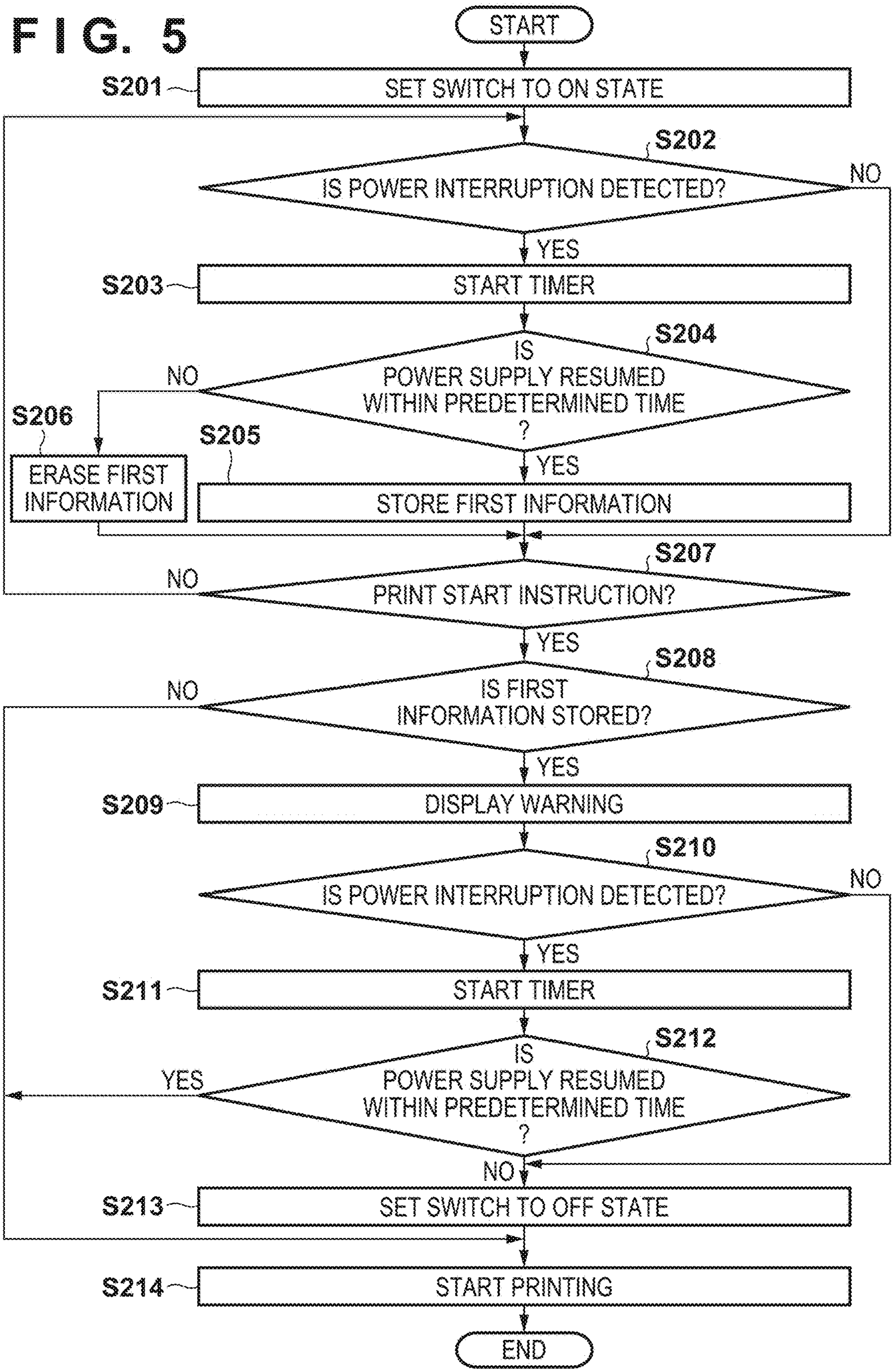
FIG. 5 is a flowchart exemplarily showing control processing according to the second embodiment.
Figure 6:
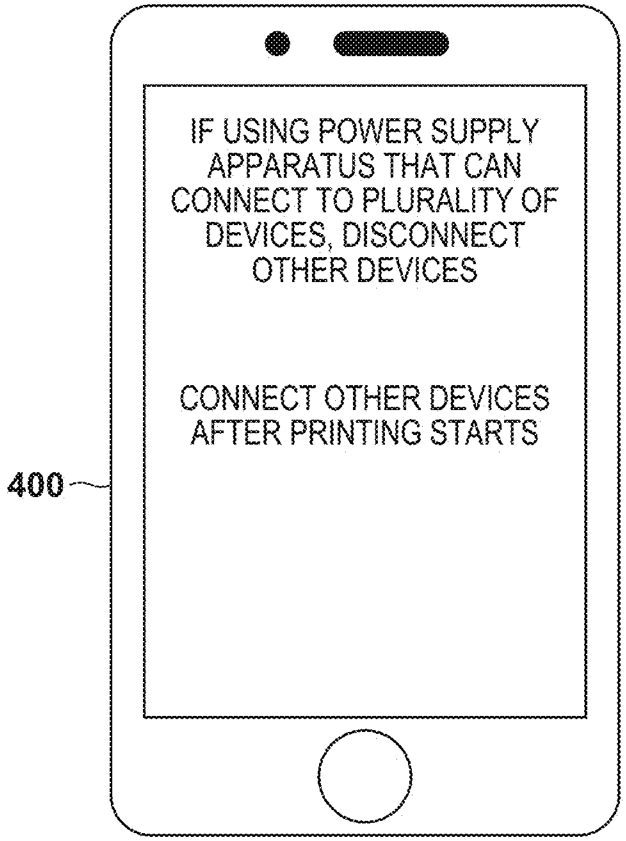
FIG. 6 is a view exemplarily showing a warning screen displayed on an external apparatus in the control processing according to the second embodiment.

FIG. 5 is a flowchart exemplarily showing power supply control of a printing apparatus 100 according to the second embodiment. FIG. 6 exemplarily shows a warning screen displayed on an external apparatus 400 in the power supply control of the printing apparatus 100 according to the second embodiment.

The configuration of the printing apparatus 100 according to the second embodiment is the same as in FIG. 2 of the first embodiment.

Processing of steps S201 to S208 are the same as steps S101 to S108 in FIG. 3.

In step S208, upon determining that first information is stored in the memory unit 111, the control unit 109 advances the processing to step S209. Upon determining that the first information is not stored in the memory unit 111, the control unit 109 advances the processing to step S214.

In step S209, the control unit 109 transmits second information and a display instruction to the external apparatus 400. The external apparatus 400 displays the warning screen exemplarily shown in FIG. 6 based on the second information and the display instruction received from the printing apparatus 100. In the example shown in FIG. 6, the second information is information for inducing the user to disconnect power receiving devices other than the printing apparatus 100 connected to a power supply apparatus 200 and, after the start of printing, not to connect other power receiving devices other than the printing apparatus 100 to the power supply apparatus 200.

In step S210, the control unit 109 determines whether the power supplied from the power supply apparatus 200 is cut off, similarly as step S102. Upon determining that a PD controller 104 detects interruption of power supply from the power supply apparatus 200, the control unit 109 advances the processing to step S211. Upon determining that interruption of power supply from the power supply apparatus 200 is not detected by the PD controller 104, and the power is continuously supplied from the power supply apparatus 200, the control unit 109 advances the processing to step S213.

In step S211, the control unit 109 starts counting time using a timer and measures an elapsed time from interruption of power supply from the power supply apparatus 200, similarly as step S103.

In step S212, the control unit 109 determines whether power supply from the power supply apparatus 200 is resumed within a predetermined time from the interruption of power supply from the power supply apparatus 200, similarly as step S104. When the PD controller 104 detects that power supply from the power supply apparatus 200 is resumed, the control unit 109 refers to the time measured by the timer started in step S211 and determines whether the time of the interruption of power supply from the power supply apparatus 200 is a predetermined time or less. Upon determining that the time of the interruption of power supply from the power supply apparatus 200 is the predetermined time or less, the control unit 109 advances the processing to step S214. Upon determining that the time of the interruption of power supply from the power supply apparatus 200 exceeds the predetermined time, the control unit 109 advances the processing to step S213.

In step S213, the control unit 109 sets the switch 108 to the OFF state by the PD controller 104, similarly as step S109. The power control unit 107 switches the power to be supplied to the control unit 109 and a printing unit 112 from the power supplied from the power supply apparatus 200 to the power of a battery 106.

In step S214, the control unit 109 starts print processing by the printing unit 112 based on image data and the print instruction received from the external apparatus 400, and ends the processing, similarly as step S111. Note that upon determining in step S212 that the time of the interruption of power supply from the power supply apparatus 200 is the predetermined time or less, the control unit 109 starts print processing while keeping the switch 108 in the ON state.

In the present embodiment, when it is detected in step S204 that instantaneous power supply interruption has occurred, and the first information is stored in the memory unit 111 in step S208, it is estimated that there is high possibility that negotiation will be executed after the power supply apparatus 200 and the printing apparatus 100 are connected. For this reason, in step S209, the second information for inducing the user to disconnect other power receiving devices connected to a power supply apparatus 200 is displayed on the external apparatus 400. When the user disconnects the other power receiving devices from the power supply apparatus 200 in accordance with the second information, the power supply apparatus 200 executes negotiation with the printing apparatus 100 again, and therefore, instantaneous power supply interruption occurs. Hence, in the present embodiment, when the occurrence of instantaneous power supply interruption is detected in steps S210 to S212, it can be determined that the user has disconnected the other power receiving devices from the power supply apparatus 200 in accordance with the second information. In this case, since the possibility that the power supply apparatus 200 will execute negotiation with the printing apparatus 100 again during print processing is low, print processing is started while keeping the switch 108 in the ON state.

On the other hand, when the occurrence of instantaneous power supply interruption cannot be detected in steps S210 to S212, it can be determined that the user has not taken appropriate measures in accordance with the second information. In this case, there is high possibility that the user will connect or disconnect another power receiving device to or from the power supply apparatus 200 during print processing, the power supply apparatus 200 executes negotiation with the printing apparatus 100 again, and instantaneous power supply interruption occurs. Hence, in the present embodiment, print processing is started after the switch 108 is switched to the OFF state in step S213. This can reduce the possibility of occurrence of a printing failure even when negotiation is executed again during print processing, and instantaneous power supply interruption occurs.

Third Embodiment

The third embodiment will be described next with reference to FIGS. 2, 7, and 8.

Figure 7:
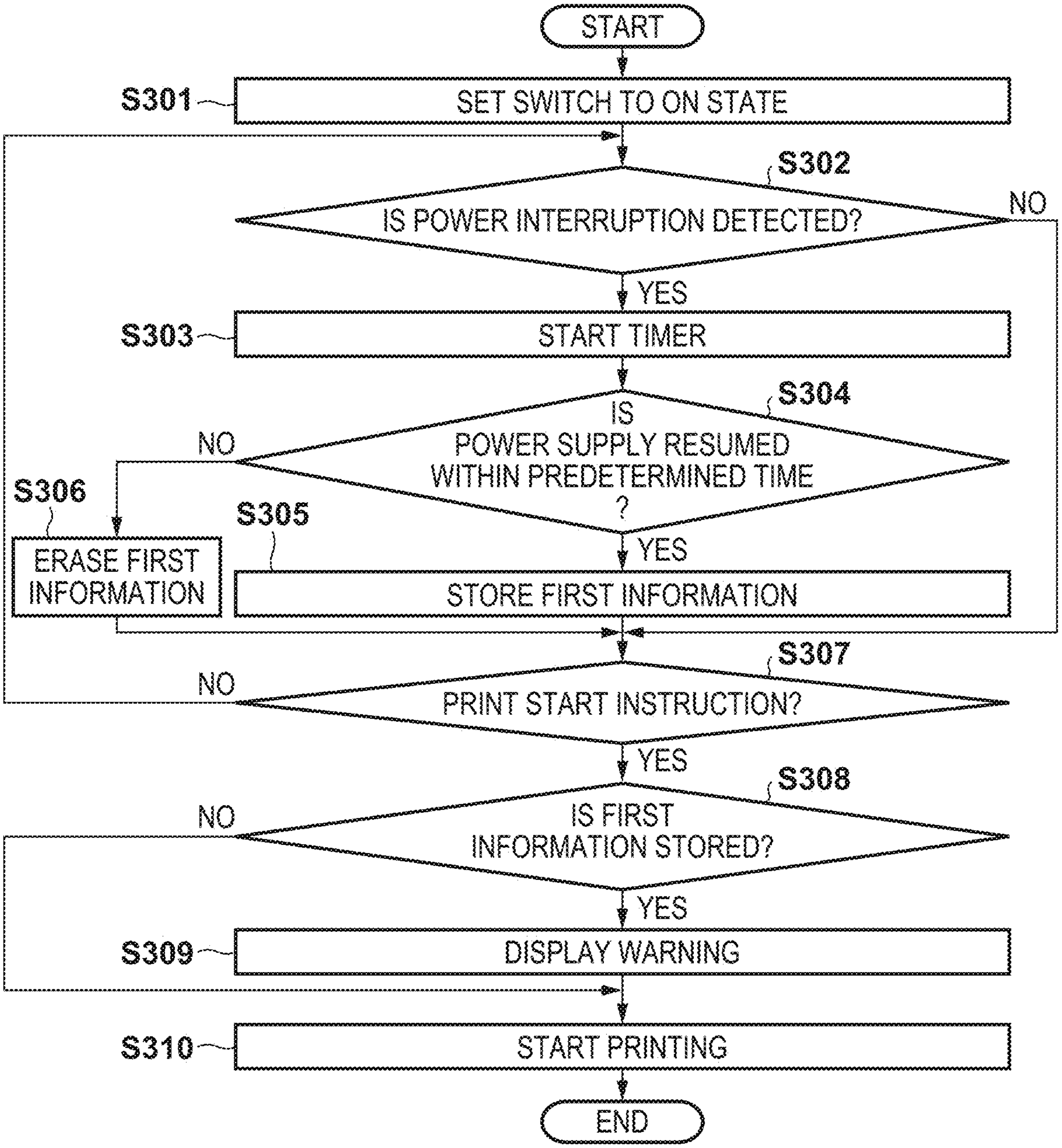
FIG. 7 is a flowchart exemplarily showing control processing according to the third embodiment.
Figure 8:
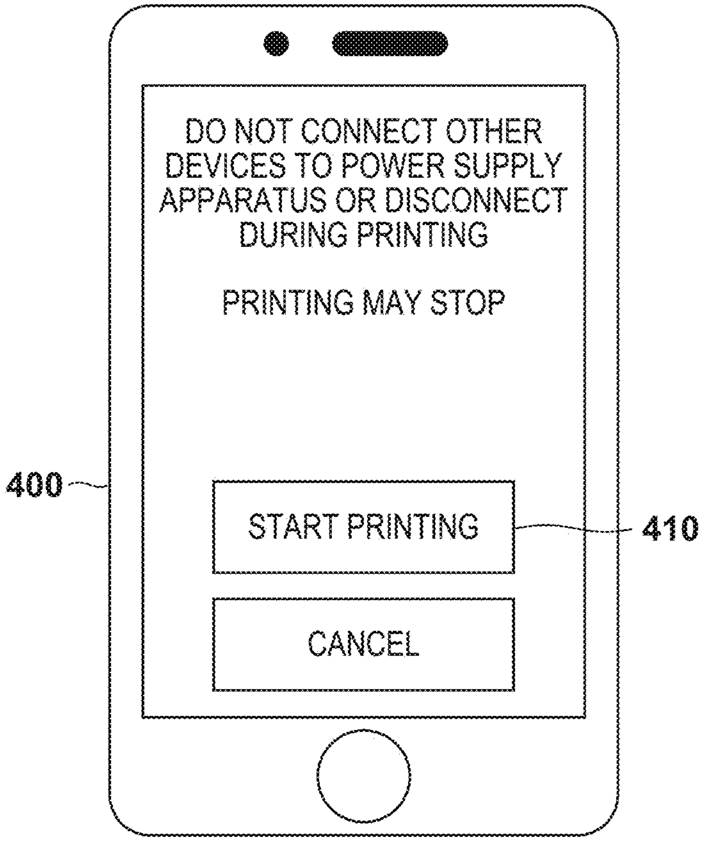
FIG. 8 is a view exemplarily showing a warning screen displayed on an external apparatus in the control processing according to the third embodiment.

FIG. 7 is a flowchart exemplarily showing power supply control of a printing apparatus 100 according to the third embodiment. FIG. 8 exemplarily shows a warning screen displayed on an external apparatus 400 in the power supply control of the printing apparatus 100 according to the third embodiment.

The configuration of the printing apparatus 100 according to the third embodiment is the same as in FIG. 2 of the first embodiment.

Processing of steps S301 to S310 are the same as steps S101 to S108, S110, and S111 in FIG. 3.

In the present embodiment, in step S304, the occurrence of instantaneous power supply interruption is detected. Even when first information is stored in the memory unit 111 in step S308, a switch 108 is not switched to the OFF state, unlike the first and second embodiments, and in step S309, the control unit 109 transmits third information and a display instruction to the external apparatus 400. The external apparatus 400 displays the warning screen exemplarily shown in FIG. 8 based on the third information and the display instruction received from the printing apparatus 100. In the example shown in FIG. 8, the third information is information for inducing the user not to connect or disconnect power receiving devices other than the printing apparatus 100 connected to a power supply apparatus 200 during print processing and notifying the user that there is possibility that the print processing will be stopped by instantaneous power supply interruption. When the user operates a print start button 410 shown in FIG. 8 upon receiving the third information, the processing advances to step S310, and the control unit 109 accepts a user operation for starting print processing and starts print processing by a printing unit 112.

In the present embodiment, when it is detected in step S304 that instantaneous power supply interruption has occurred, and the first information is stored in the memory unit 111 in step S308, it is estimated that there is high possibility that negotiation will be executed after the power supply apparatus 200 and the printing apparatus 100 are connected. For this reason, in step S309, the third information for inducing the user not to connect or disconnect other power receiving devices other than the printing apparatus 100 to or from the power supply apparatus 200 is displayed on the external apparatus 400, thereby reducing possibility that the power supply apparatus 200 will execute negotiation with the printing apparatus 100 again during print processing. Also, even in a case where the user connects or disconnects another power receiving device other than the printing apparatus 100 to or from the power supply apparatus 200 during print processing, the power supply apparatus 200 executes negotiation with the printing apparatus 100 again, and a printing failure occurs, the third information shown in FIG. 8 is notified to the user before printing, thereby allowing the user to recognize the cause of the printing failure and preventing the occurrence of a printing failure due to the same cause.

Note that in the above-described embodiments, a printing apparatus has been exemplified as a power receiving device connected to the power supply apparatus 200. However, the aspect of the embodiments is not limited to this, and the power receiving device other than the printing apparatus may be a mobile communication device. Since the mobile communication device that receives power supplied from the power supply apparatus to which a plurality of power receiving devices can be connected executes negotiation with the power supply apparatus every time another power receiving device other than the mobile communication device is connected to the power supply apparatus, power supply from the power supply apparatus to the mobile communication device may instantaneously be interrupted, and communication processing may temporarily be stopped. Also, if connection or disconnection between the power supply apparatus and another power receiving device is repetitively performed, a phenomenon that communication is temporarily interrupted frequently occurs at high possibility. The user can hardly specify the cause of interruption of communication. Hence, similarly as the printing apparatus, for the mobile communication device as well, if a plurality of power receiving devices can be connected to the power supply apparatus, the power supply of the mobile communication device is switched from the power supply apparatus to the battery.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-193845, filed Nov. 14, 2023, which is hereby incorporated by reference herein in its entirety.

What is claimed is:

1. A processing apparatus comprising:

a battery;

one or more processors; and at least one memory coupled to the one or more processors storing instructions that, when executed by the one or more processors, cause the one or more processors to function as:

a receiving unit configured to receive power from a power supply apparatus connected to the processing apparatus;

a processing unit configured to execute predetermined processing by the power of the power supply apparatus or the power of the battery; and a control unit configured to switch the power to be supplied to the processing unit to the power supplied from the power supply apparatus or the power of the battery, wherein while the power is being supplied from the power supply apparatus to the processing unit, the control unit performs control (1) to switch the power supply to the processing unit from the power supply apparatus to the battery when the predetermined processing is to be executed by the processing unit and a resumption of the power supply from the power supply apparatus to the processing unit is detected within a predetermined time after an interruption of the power supply from the power supply apparatus to the processing unit is detected, and (2) not to switch the power supply to the processing unit from the power supply apparatus to the battery when the predetermined processing is not to be executed by the processing unit.

2. The apparatus according to claim 1, wherein after the power to be supplied to the processing unit is switched to the power of the battery, the control unit controls such that the processing unit starts the predetermined processing by the power of the battery.

3. The apparatus according to claim 1, wherein the control unit stores, in a memory, first information indicating that the power supply of the power supply apparatus is resumed within the predetermined time from the stop of the power supply of the power supply apparatus, and when the power supply of the power supply apparatus is resumed after an elapse of the predetermined time from the stop of the power supply of the power supply apparatus, the first information stored in the memory is erased.

4. The apparatus according to claim 3, wherein based on the first information, the control unit switches the power to be supplied to the processing unit to the power supplied from the power supply apparatus or the power of the battery.

5. The apparatus according to claim 1, wherein when the power to be supplied to the processing unit is switched to the power of the battery, the control unit notifies a user of second information indicating that the power to be supplied to the processing unit is switched to the power of the battery, and there is possibility that a remaining amount of the battery will decrease.

6. The apparatus according to claim 1, wherein when the power supply of the power supply apparatus is resumed within the predetermined time from the stop of the power supply of the power supply apparatus, the control unit notifies a user of predetermined information for inducing the user to disconnect other power receiving devices other than the processing apparatus connected to the power supply apparatus and, after a start of the predetermined processing by the processing unit, not to connect the other power receiving devices to the power supply apparatus.

7. The apparatus according to claim 6, wherein when, after the notification of the predetermined information, the power supply of the power supply apparatus is not resumed within the predetermined time from the stop of the power supply of the power supply apparatus, the control unit switches the power to be supplied to the processing unit to the power of the battery.

8. The apparatus according to claim 1, wherein even when the power supply of the power supply apparatus is resumed within the predetermined time from the stop of the power supply of the power supply apparatus, the control unit notifies a user of fourth information for inducing the user not to connect and disconnect another power receiving device other than the processing apparatus connected to the power supply apparatus during the predetermined processing, and when a user operation for starting the predetermined processing is accepted, controls such that the processing unit starts the predetermined processing without switching the power to be supplied to the processing unit to the power of the battery.

9. The apparatus according to claim 5, further comprising a communication unit configured to communicate with an external apparatus, wherein the control unit displays the information on the external apparatus.

10. The apparatus according to claim 9, wherein upon receiving an instruction for starting the predetermined processing from the external apparatus, the control unit controls such that the processing unit starts the predetermined processing.

11. The apparatus according to claim 1, further comprising a switching unit configured to switch the power to be supplied to the processing unit to the power of the power supply apparatus or the power of the battery, wherein the power supplied from the power supply apparatus is directly supplied to the processing unit via a switch.

12. The apparatus according to claim 1, wherein the power supply apparatus can simultaneously supply the power to a plurality of power receiving devices connected to the power supply apparatus.

13. The apparatus according to claim 1, wherein the processing apparatus and the power supply apparatus comply with the Universal Serial Bus (USB) Power Delivery (PD) standard.

14. The apparatus according to claim 1, wherein the processing apparatus is a printing apparatus, and the predetermined processing is print processing.

15. The apparatus according to claim 1, wherein the processing apparatus is a mobile communication device, and the predetermined processing is communication processing.

16. A method of a processing apparatus, wherein the processing apparatus includes:

a battery;

one or more processors; and at least one memory coupled to the one or more processors storing instructions that, when executed by the one or more processors, cause the one or more processors to function as:

a receiving unit configured to receive power from a power supply apparatus connected to the processing apparatus; and a processing unit configured to execute predetermined processing by the power of the power supply apparatus or the power of the battery, the method comprising:

switching the power to be supplied to the processing unit to the power supplied from the power supply apparatus or the power of the battery, and in the switching, while the power is being supplied from the power supply apparatus to the processing unit, the control unit performs control (1) to switch the power supply to the processing unit from the power supply apparatus to the battery when the predetermined processing is to be executed by the processing unit and a resumption of the power supply from the power supply apparatus to the processing unit is detected within a predetermined time after an interruption of the power supply from the power supply apparatus to the processing unit is detected, and (2) not to switch the power supply to the processing unit from the power supply apparatus to the battery when the predetermined processing is not to be executed by the processing unit.

17. The method according to claim 16, further comprising switching the power to be supplied to the processing unit to the power of the power supply apparatus or the power of the battery, wherein the power supplied from the power supply apparatus is directly supplied to the processing unit via the switching.

18. A non-transitory computer-readable storage medium storing a program for causing a computer to perform a method of a processing apparatus, the method comprising:

receiving power from a power supply apparatus connected to the processing apparatus;

executing predetermined processing by the power of the power supply apparatus or power of a battery; and switching the power to be supplied to a processing unit to the power supplied from the power supply apparatus or the power of the battery, in the switching, while the power is being supplied from the power supply apparatus to the processing unit, the control unit performs control (1) to switch the power supply to the processing unit from the power supply apparatus to the battery when the predetermined processing is to be executed by the processing unit and a resumption of the power supply from the power supply apparatus to the processing unit is detected within a predetermined time after an interruption of the power supply from the power supply apparatus to the processing unit is detected, and (2) not to switch the power supply to the processing unit from the power supply apparatus to the battery when the predetermined processing is not to be executed by the processing unit.

19. The non-transitory computer-readable storage medium according to claim 18, further comprising switching the power to be supplied to the processing unit to the power of the power supply apparatus or the power of the battery, wherein the power supplied from the power supply apparatus is directly supplied to the processing unit via the switching.

* * * * *